Figure 1:
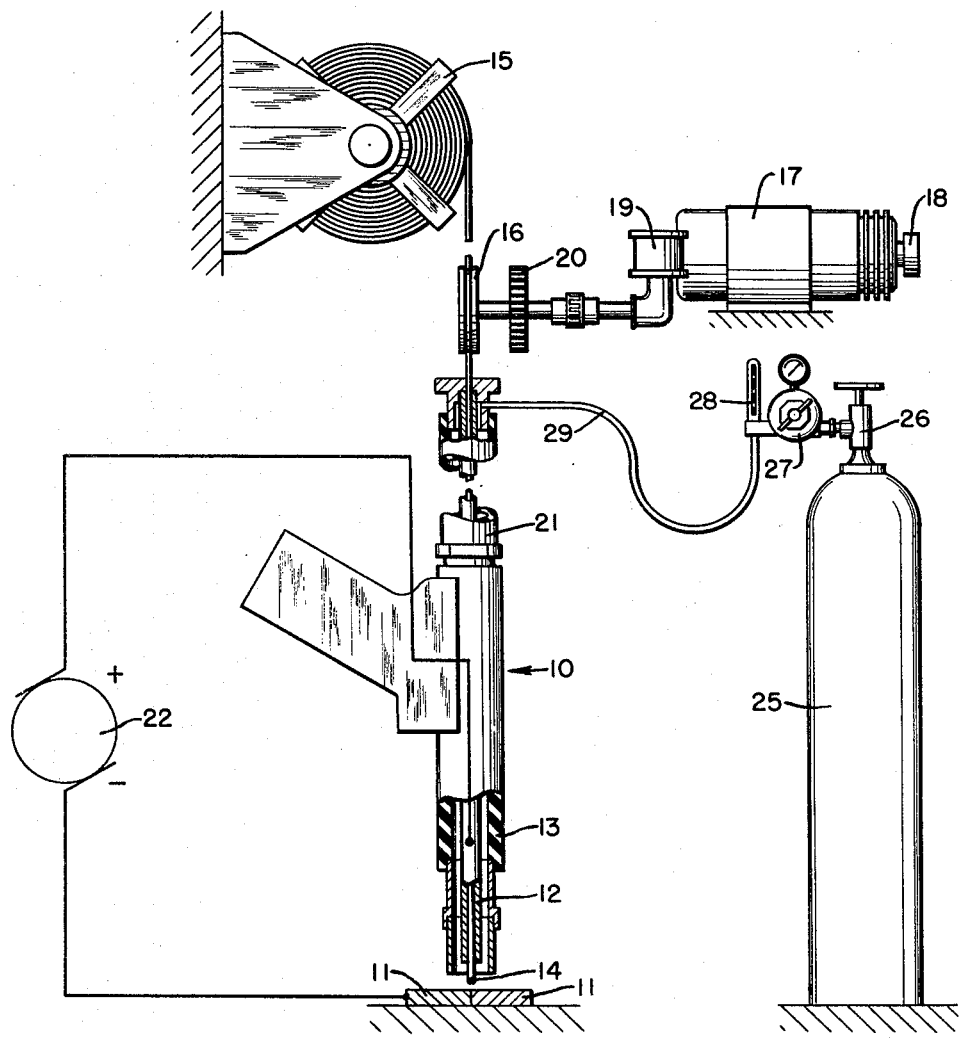

Aug. 4, 1964  J. S. SOHN ETAL  3,143,631
ELECTRIC ARC WELDING
Filed Jan. 6, 1951  2 Sheets-Sheet 1

INVENTORS
JESSE S. SOHN
HAROLD ROBINSON
BY
ATTORNEY 3,143,631
ELECTRIC ARC WELDING
Jesse S. Sohn, Succasunna, and Harold Robinson, Somerville, N.J., assignors to Air Reduction Company, Incorporated, New York, N.Y., a corporation of New York
Filed Jan. 6, 1951, Ser. No. 204,722
4 Claims. (Cl. 219—74)

This invention relates generally to gas shielded electric arc welding and more particularly to an improved inert gas welding atmosphere and to a method and apparatus for welding employing the novel welding atmosphere.

Arc welding has become an industrial tool of great importance and a great amount of development work has been done to raise the quality of the welds so produced, and also to increase the efficiency of arc welding operations. The commercial developments have most frequently taken the form of improved stick electrode coatings, fluxes, core wires, etc. Outstanding achievements of a more fundamental nature have been the development of commercially successful inert gas shielded consumable and non-consumable electrode welding methods and apparatus. In the inert gas shielded type of welding, an electric arc is established between an electrode and the work, and the heated end of the electrode, the arc, and the weld puddle are enveloped in an atmosphere of inert gas, such as helium and/or argon. The electrode may be non-consuming type such as tungsten, which may or may not be mixed with thoria or the like to improve its arcing characteristics. The electrode may also be a consuming filler wire electrode of the same composition, or substantially the same composition, as the work being welded, or it may be a consuming filler wire electrode of different composition than the workpiece where the process is being used for hard facing or other overlay type work, or where the weld is to be imbued with different properties than the properties of the workpiece. For a complete disclosure of such a consuming electrode process, and apparatus therefor, reference is made to Patent No. 2,504,868 issued April 18, 1950 to A. Muller et al.

An object of this invention is to provide improvements in inert gas shielded welding wherein an arc is maintained between an electrode and the work and in which the electrode, arc, and weld puddle are enveloped in a protective gaseous atmosphere; in particular, it is an object of the invention to provide improvements in consumable filler wire electrode inert gas shielded welding, as disclosed in said Muller et al. patent.

Another object is to provide a novel inert gas arc welding atmosphere which will produce improved electric arc characteristics.

Another object is to provide a novel inert gas shielding atmosphere which will produce improved weld bead contour at relatively high welding speeds.

A further object is to provide a new and improved compressed inert gas composition, bottled in welding tanks or containers for sale and use with arc welding systems.

Another object is to provide an improved process preventing undercut in the inert gas welding of ferrous metals, including plain carbon steels, low alloy steels and high alloy steels (for example, stainless steels).

These and other objects that will become apparent from the following detailed description may be achieved by employing, in the manner disclosed herein, a gaseous shield consisting of small percentages of oxygen mixed in definite novel proportions with a substantially pure monatomic inert gas or a mixture of substantially pure monatomic inert gases.

In the accompanying drawings, FIG. 1 illustrates schematically a form of apparatus for gas shielded metal arc welding according to the present invention.

Figure 2:
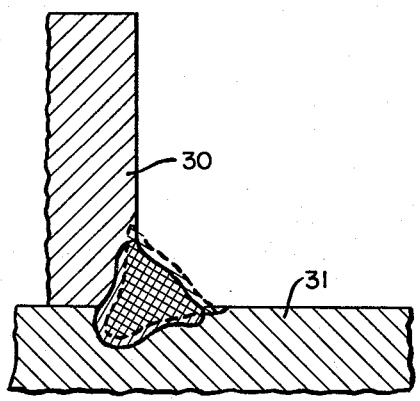
Figure 3:
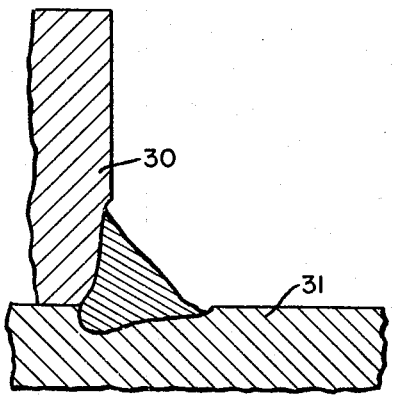
Figure 4:
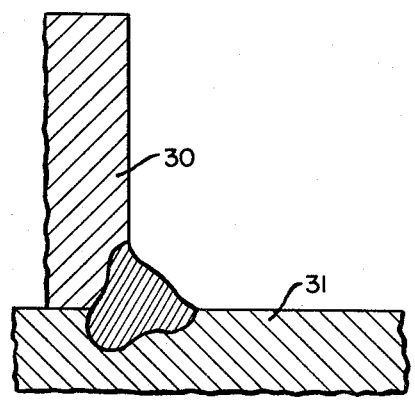

FIG. 2 is a sectional view, on an enlarged scale, of a fillet joint illustrating in dotted lines the contour of the weld metal when the joint is welded by a prior art inert gas shielded method and superimposed thereon in full lines, the contour of the weld metal when the same joint is made according to the present invention. FIG. 3 illustrates the prior art weld of FIG. 2 by itself. FIG. 4 illustrates the same joint welded by the present invention.

Figure 5:
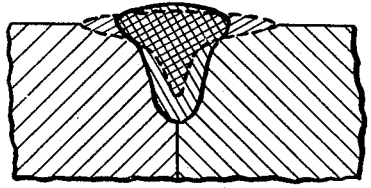

FIG. 5 is a sectional view, on an enlarged scale, of a square butt joint illustrating in dotted lines the contour of the weld metal when the joint is welded by a prior art inert gas shielded method, and superimposed thereon in full lines the contour of the weld metal when the same joint is made according to the present invention.

Referring to FIG. 1, a welding gun 10 is illustrated in operable position with respect to the work 11 to be welded. This welding gun is similar to the one disclosed in the Muller et al. Patent No. 2,504,868 previously referred to. Basically, it consists of an inner wire guide and welding current contact element 12 surrounded by an outer barrel 13. A welding electrode 14 is withdrawn from a coiled supply on reel 15 by a pair of feed rolls 16 which are driven by motor 17. The motor illustrated is governor controlled and operates at a constant preselected speed determined by the position of the governor control knob 18. The feed rolls are driven by the motor 17 through reduction gears enclosed in housing 19. Both feed rolls 16 (one roll not visible in drawing as it is obscured by the front roll to which reference character 16 is applied) are driven rolls, which is accomplished by a meshing pair of spur gears, one of which is visible and designated 20.

The wire 14, withdrawn from reel 15 by feed rolls 16, is pushed through the welding gun lead conduit 21 and then through the welding gun 10. Welding current is supplied as shown, with D.C. reverse polarity from a welding machine 22, which in the instance illustrated is a D.C. generator, to the electrode and the work to maintain the welding arc. The welding current is introduced into the welding wire 14 from the tubular contact element 12 as the wire passes through the tube 12 and makes electrical contact therewith. A supply of shielding gas is provided in cylinder 25. The gas discharged from cylinder 25 passes through the customary cylinder valve 26, pressure regulator 27, and flow meter 28, and is delivered by tube 29 to the welding gun lead conduit 21. From lead conduit 21 the shielding gas passes into the annular space in gun 10 that is formed between the barrel 13 and tubular member 12 and is discharged as an annular envelope around the electrode, the arc, and the weld pool. As disclosed in the aforementioned Muller et al. patent, the gas is preferably delivered as a substantially non-turbulent flow stream at a rate of from about 30 to about 150 cubic feet per hour. This shield may be formed, for instance, in the manner more fully explained in Mikhalapov application Serial No. 83,638 filed March 26, 1949, now Patent 2,544,711 issued March 13, 1951. Such a nonturbulent shield substantially completely excludes the ambient air from the arc and thus insures that the inert gas composition through which the arc is maintained will be substantially the same as the composition of the gas fed to the arc through lead 21 from the welding gas tank 25.

In operation, the arc is established from the electrode 14 to the work 11 and is enveloped in the gas shield projected from the welding gun barrel. The electrode is continuously fed to maintain the arc in equilibrium, i.e., the wire feed-rate is made equal to the burn-off rate of the wire. The electrode wire is deposited on the work and fuses therewith while the welding gun is moved relative to the work to form the weld.

A welding operation properly conducted as above and employing a high purity monatomic inert gas as the shielding medium produces a sound weld substantially free of the formation of oxides. The process enables relatively high current densities to be employed, thus producing a deeply penetrating hot arc which makes it possible to produce welds at very high speed. Such high speed welding is very desirable (for instance, in the welding of steel) but under certain circumstances the contour of the weld is adversely affected. We have found, according to the present invention, that if the same welding procedure is followed, but a certain small quantity of oxygen is added to the shielding gas, the weld contour can be controlled in a manner that is beneficial and that results in highly satisfactory weld bead contours even with the higher weld speeds and currents.

For example, FIG. 2 illustrates a horizontal fillet weld joining two stainless steel workpieces. When plates 30 and 31 are ½" thick, Type 316 stainless steel (C .10%; Mn 2%; P .04%; S .03%; Si 1.0%; Cr 16–18%; Ni 10–14%; Mo 2–3%; balance Fe), and are welded with a $\frac{1}{16}$" diameter, Type 316 stainless steel welding wire and 99.9% purity argon is employed as the shielding gas at a flow rate of 60 cubic feet per hour with a welding current of 290 amperes and a travel speed of 14 inches per minute, the weld metal contour illustrated by the broken line results (see also FIG. 3). It is apparent that this fillet is badly undercut, i.e., the depression produced in the plate by the arc is not completely filled by the weld metal leaving a depression along the edges of the weld which reduces the strength of the weld by creating a notch to concetrate stresses in addition to reducing the cross section of the members being welded near the edge of the weld. However, we have found that when the shielding gas employed is a mixture which contains approximately 1% by volume of oxygen and the balance 99.9% pure argon, and all other conditions are identical to those recited above, the weld metal assumes the contour shown by the solid outline on FIG. 2 (see also FIG. 4). The joint is free from undercut and the weld has penetrated deeply.

FIG. 5 is another example of the effect of oxygen additions to the inert gas shield in inert gas shielded metal arc welding practice. The broken outline depicts a cross section of the weld metal in a butt weld produced by the method and apparatus previously described using a high purity inert monatomic shielding gas. The solid outline in the same figure depicts the contour assumed by the weld metal when small oxygen additions, in the proportions given above, are made to the same shielding gas. The oxygen addition produces increased penetration and a narrower bead having improved weld reinforcement. This means that with oxygen additions higher quality welds than those made with pure inert shielding gas can be made at the same welding speed.

Analogously, welding speeds may be increased without reducing weld quality. The explanation of why this unexpected result occurs is probably not simple. When high purity inert gas is used as the shielding atmosphere in the welding process disclosed in the previously referred to Muller et al. Patent No. 2,504,868, we have observed that there is a primary cathode spot formed on the workpiece which is one terminal of the welding arc and which is the primary area of electron emission. In addition, however, there are what appear to be transient secondary cathode spots near the edges of the weld puddle which support fluctuating secondary arcs. These secondary arcs have a decided heating effect on the area on which they play and effectively spread the cathode heating over a larger area, producing a wide depression in the plate under the arc. We have also observed that when the proper small addition of oxygen is made to the shielding gas the secondary cathode spots and the secondary arcs disappear, the arc voltage is lower, and the arc is produced only in the single and stable primary cathode spot, producing only a narrow depression in the plate under the arc. Despite the reduction in arc power (lower arc voltage, same current) this increases weld penetration directly under the arc and reduces the heating around the edges of the weld puddle, which improves the weld contour as disclosed above. The elimination of the secondary cathodes may be the result of the formation of very small amounts of metallic oxides which are good emitters of electrons and make it possible for the primary cathode spot to readily supply sufficient electrons to sustain the arc, or it may be the result of the increased temperature in the arc caused by the exothermic reaction of the oxygen with the metal vapor in the arc region. In any event, the phenomena is observable and it produces new and unexpected results.

We have found that a gas mixture consisting of 1% by volume of 99.5% pure oxygen and 99% by volume of 99.9% pure argon gives excellent results. We have found further that about 0.7 to about 1.5% by volume of about 99.5% pure oxygen maye be used, with the balance high purity monatomic inert gas, without sacrificing any of the advantages derived from our invention. Considerable advantage can be gained, without incurring appreciable disadvantages through loss of minute quantities of oxidizable electrode alloying constituents, by using about 0.5 to about 2% oxygen by volume, which range while not assuring perfection is satisfactory for a large number of welding operations. Analysis of weld metal produced by this invention reveals no practically measurable quantities of metallic oxides due to the oxygen addition to the inert shielding gas when the oxygen addition does not exceed 1.5% by volume of the total. More oxygen than this begins to form oxide inclusions which, when the oxygen exceeds about 2%, results in loss of highly-oxidizable alloying ingredients to a point which may at larger oxygen concentrations cause the weld to be metallurgically unacceptable, unless the percentage of the highly-oxidizable alloying elements in the electrode is increased to allow for the losses due to oxidation during transfer. Thus, while the oxygen can be added to the arc according to the invention in large quantities it begins to produce appreciable oxidation losses when used in amounts greater than about 2% by volume of the shielding gas. Thus, it is obvious that the top limit on the amount of oxygen added is primarily dependent upon the degree of oxidation that is acceptable in a given operation. Slightly less than 0.5% oxygen by volume of the total is insufficient to produce appreciable beneficial results. At 0.5% oxygen definite beneficial results are observable and improvements occur rapidly as the quantity of oxygen addition is increased up to about 0.7% by volume of the total mixture. Further additions beyond 0.7% oxygen produce little change until the value of about 1.5% oxygen in the preferred range is reached, above which oxidation of electrode alloying elements during transfer gradually becomes appreciable, and eventually unacceptably detrimental when relatively large quantities of oxygen are used with electrodes having relatively small quantities of highly-oxidizable alloying ingredients.

The inert gas and the oxygen referred to may be obtained from any source providing they are free of substantial amounts of impurities, particularly impurities such as hydrogen, nitrogen, sulphur, halogens, the compounds of all these elements and/or other impurities in amounts that would react detrimentally with the weld metal or cause porosity in the weld metal.

Where argon is employed as the monatomic inert gas, the argon and the oxygen are both preferably derived from atmospheric air by the process of liquefaction and rectification which assures freedom from the undesirable elements and compounds listed above. Argon so produced is distributed commercially with a purity of 99.9%, the very small balance being largely nitrogen. However, this quantity of nitrogen is insufficient to have a detrimental effect on the weld. Similarly, oxygen so produced is distributed commercially with a purity of 99.5% with the balance largely argon. Since argon and oxygen are evolved successively in the rectification of liquid air, it has been found possible according to the invention to produce argon having a purity of about 99.9% in admixture with the preferred range of about 0.7 to about 1.5% by volume of oxygen directly, if desired, by appropriate tapping of a rectification column in a commercial air liquefaction and separation system.

As indicated above, the present invention is particularly useful for welding steel with the Muller et al. process at higher welding speeds. These higher speeds are readily attained due to properties inherent in the process, namely, greatly increased current densities, continuous wire feed, concentrated arc, and inert gas shielding. The use of high purity inert gas with oxygen additions in such process enables full advantage to be taken of its inherent high welding speeds.

For the high current, high speed welding of steels by the said Muller et al. process, argon is found to be definitely superior to helium. The use of argon of 99.9% purity alone however, presents a serious difficulty: horizontal fillet welds can not be made without severe undercutting. This is believed to be caused by the pronounced positive ion bombardment occurring in an argon shielded arc at high currents. The undercutting is usually accompanied by erratic arc behavior. With downhand welding, the erratic arc is, of course, more serious than the undercutting. The present discovery, involving the maintenance of the welding arc through an arc atmosphere of inert monatomic gas and oxygen in a mixture of definite novel proportions, enables these problems to be overcome. When oxygen is added to the originally 99.9% pure argon in an amount sufficient to provide 0.7% oxygen in the resultant mixture, the undercutting and erratic arc behavior are eliminated. A maximum of 1.5% oxygen can be used without appreciably affecting the chemical analysis of deposited metal. In other words, essentially 100% transfer of the constituents of the electrode across the arc and into the weld bead still obtains.

This same arc shielding atmosphere has been found beneficial in the gas shielded consumable electrode arc welding of aluminum. Because of the capacity of an aluminum workpiece to dissipate heat from the edge of the weld puddle, undercut is not a serious problem as it is in steel welding. However, when the current is raised above some critical value for a particular set of welding conditions, the molten weld metal erupts in a clearly visible phenomena which results in a weld bead having oxide inclusions and an irregular, foliated surface. We have found that the use of our improved shielding gas mixture permits higher welding currents to be used without encountering this undesirable result. This means, of course, that the welding speed may be increased. Furthermore, the use of our improved shielding gas mixture improves arc stability.

For example, in butt welding 1 inch thick, 3S (1.2% Mn, balance Al) aluminum plates in a pure argon atmosphere with a 3/16" diameter, 43S (5% Si, balance Al) aluminum wire as the electrode, a current of 550 amperes produces eruptions, oxidation, rough surface, etc. When 1% oxygen is added to the argon under the same conditions, the current can be raised to more than 600 amperes without producing eruptions from the weld puddle and the accompanying surface irregularities.

The invention is particularly applicable as stated above to the welding of ferrous alloys with substantially pure argon having oxygen additions within the range stated above, for the primary purpose of preventing undercut. However, it is also useful with aluminum as described above and with other metals, with other shielding gases, and for other purposes. For example, it provides improved arc control (i.e., steadiness of arc voltage, arc length and arc direction) and increased arc stability; it improves the shape of the weld bead (and eliminates undercut); and in most instances decreases vaporization of the molten weld metal. These improved results occur at the lower as well as at the higher weld currents and weld speeds, though the improvements in arc control are particularly apparent at the lower welding currents and speeds whereas the elimination of undercut, reduction in vaporization, and improvements in bead contour are especially apparent at the higher welding speeds and currents.

While oxygen additions to the arc atmosphere according to the invention have been found most beneficial for use with argon, and especially substantially pure argon, such additions are also advantageous when used with other inert monatomic welding gases or mixtures thereof, for example, with helium or mixtures of argon and helium. Oxygen, as distinguished from oxygen containing compounds is most beneficial as the adidtion agent to the inert gas arc atmosphere, and it is preferably provided as a homogeneous mixture with the inert gas, the mixture being placed under high pressure (for instance, about 2000 pounds per square inch) in a welding gas cylinder or container from which it is supplied through a flexible conduit to the shielding gas passages of the welding torch. However, the oxygen may, under some circumstances, be supplied in other forms and in other ways to the arc atmosphere. We have found that undercut in steel welding with the Muller et al. process can be obviated by using a shielding gas mixture consisting essentially or argon (and/or other inert monatomic gas) containing carbon dioxide in a concentration by volume of from about 3 to about 10%. It is believed that the carbon dioxide so mixed wth the inert monatomic gas in said range is broken down or partially decomposed by the heat of the arc, to provide in the arc atmosphere an effective quantity of oxygen in the range from about 0.5 to about 2%, as given above. Appropriate mixtures of oxygen and carbon dioxide or mixtures of any suitable gases that will liberate the required amount of oxygen in the arc region may also be added to the monatomic inert gas with beneficial results.

The welding of all ferrous and non-ferrous workpiece materials is thought to be benefited by the present invention, but the invention is most beneficial to the welding of steel, both ferritic and austenitic, including stainless steels and alloy and plain carbon steels.

Still another advantageous use of our novel shielding atmosphere is inthe gas shielded arc welding process employing a non-consuming electrode such as tungsten.

We have found, for example, that when a fillet weld is made in stainless steel with our new shielding gas mixture surrounding an arc between the work as an anode and a tungsten electrode as the cathode, substantially higher welding currents and welding speeds can be employed without encountering undercut. In 1/16" thick type 304 stainless steel (C .08%; Mn 2%; P .04%; S .03%; Si 1%; Cr 18–20%; Ni 8–11%; balance Fe) using a .040 inch diameter tungsten electrode (thoriated), a good fillet weld can be made without the addition of filler metal at 80 amperes with a .7% oxygen-99.3% argon shielding gas delivered at a rate of 15 cubic feet per hour. Without the oxygen addition, it is impossible to make this weld without encountering serious undercut.

When a high purity inert gas is employed as the arc shielding medium with a tungsten electrode for a given set of conditions, a certain arc voltage results. When our novel shielding gas mixture is employed under the same conditions the arc voltage is greater. This is the directly opposite effect to that observed in consumable electrode metal arc welding, wherein arc voltage is decreased by the oxygen additions. The explanation of this observed phenomena is not immediately evident. However, regardless of the theoretical explanation, the fact remains that the addition of about 0.7 to about 1.5% by volume of oxygen to substantially pure monatomic inert gas results in a gas mixture that has distinct beneficial results in both consumable electrode and non-consumable electrode gas shielded arc welding. It improves the weld metal contour in most cases, i.e., it eliminates undercut, increases penetration, and increases weld reinforcement. It localizes the arc and improves arc stability. Oxygen addition within the range specified provide a partial pressure of oxygen far above the dissociation pressure of the metal oxides, but are insufficient to form an appreciable and objectionable amount of such metal oxides. The existence of the arc crater is independent of and unaffected by the addition of oxygen. It has been observed that the amount of oxides present on the surface of the weld metal are apparently insufficient to affect the surface tension of the weld metal to any appreciable degree.

This invention is not limited to the specific embodiments disclosed herein, but may be practiced in other ways without departure from its spirit as defined by the following claims.

We claim:

1. The method of joining material by arc welding said material with a consumable electrode, which comprises the steps of impressing a potential to produce an maintain an arc sufficient to melt said electrode between said electrode and said material, striking an arc between said electrode and said material while said potential is impressed therebetween, maintaining said arc sheathed in an atmosphere of commercially pure inert gas, and adding sufficient oxygen to the atmosphere to stablize the arc, the said method being characterized by the fact that the spacing between said electrode and said material and the magnitude of the arc current are maintained such that the arc burns in a nonturbulent atmosphere so that substantially the only gas in addition to the inert gas present in said shield is said oxygen and by the further fact that the quantity of said oxygen is maintained just sufficient to stabilize the arc without oxidizing the weld.

2. A process for inert gas shielded electric arc welding in which a welding arc formed between an electrode and a workpiece is shielded from the ambient air by a monatomic inert gas, characterized by passing the welding arc current through an arc atmosphere comprising essentially inert monatomic gas to which oxygen has been added in the range from about 0.5 percent to about 2 percent by volume to stabilize the arc without oxidizing the weld, said arc being a direct current reverse polarity welding arc between ferrous electrode and workpiece materials, said monatomic inert gas being argon fed continuously to the arc as a non-turbulent arc blanketing stream, and said electrode having a diameter of ⅛ inch or less and being continuously fed to the arc at a rate of 100 inches per minute or more.

3. The method of joining material by arc welding said material with a consumable electrode, which comprises the steps of impressing a potential to produce and maintain an arc sufficient to melt said electrode between said electrode and said material, striking an arc between said electrode and said material while said potential is impressed therebetween, maintaining said arc sheathed in an atmosphere of commercially pure inert gas, and adding sufficient oxygen to the atmosphere to stabilize the arc, the said method being characterized by the fact that the spacing between said electrode and said material and the magnitude of the arc current are maintained such that the arc burns in a non-turbulent atmosphere so that substantially the only gas in addition to the inert gas present in said shield is said oxygen and by the further fact that the quantity of said oxygen is within the range of from about ½ percent to about 2 percent by volume to stabilize the arc without oxidizing the weld.

4. The method according to claim 1, characterized by the fact that the electrode is composed of ferrous metal containing highly oxidizable alloying elements.

References Cited in the file of this patent

UNITED STATES PATENTS

| | | |
|---|---|---|
| 2,053,417 | Brace | Sept. 8, 1936 |
| 2,409,388 | Rees | Oct. 15, 1946 |
| 2,424,201 | Van Nuys | July 15, 1947 |
| 2,497,589 | Dennis | Feb. 14, 1950 |
| 2,504,867 | Muller | Apr. 18, 1950 |
| 2,504,868 | Muller et al. | Apr. 18, 1950 |
| 2,544,711 | Mikhalapov | Mar. 13, 1951 |
| 2,559,132 | Roberts | July 3, 1951 |

OTHER REFERENCES

Oxidation of the Arc Crater, in Journal of American Welding Society of December 1926, pp. 11–14.

Stability of the Welding Arc, in Journal of AIEE of February 1928, pp. 109–112.

Crater Formation in Arc Welding, in Welding Research Supplement of October 1938, pp. 61–67.

Arc Welding in Controlled Atmospheres, in Welding Research Supplement of March 1940, pp. 110–S to 116–S.

Physics of the Arc and the Transfer of Metal in Arc Welding, in Welding Research Supplement of January 1943, pp. 2–S to 42–S.

UNITED STATES PATENT OFFICE
CERTIFICATE OF CORRECTION

Patent No. 3,143,631            August 4, 1964

Jesse S. Sohn et al.

It is hereby certified that error appears in the above numbered patent requiring correction and that the said Letters Patent should read as corrected below.

Column 3, line 29, for "concetrate" read -- concentrate --; column 4, line 17, for "maye" read -- may --; column 6, line 14, for "adidtion" read -- addition --; line 26, for "or", first occurrence, read -- of --; column 7, line 2, for "addition" read -- additions --; line 19, for "an", first occurrence, read -- and --; line 25, for "stablize" read -- stabilize --.

Signed and sealed this 15th day of December 1964.

(SEAL)
Attest:

ERNEST W. SWIDER
Attesting Officer

EDWARD J. BRENNER
Commissioner of Patents